T. Palmer.
Grain Binder.
N° 37408.   Patented Jan. 13, 1863.
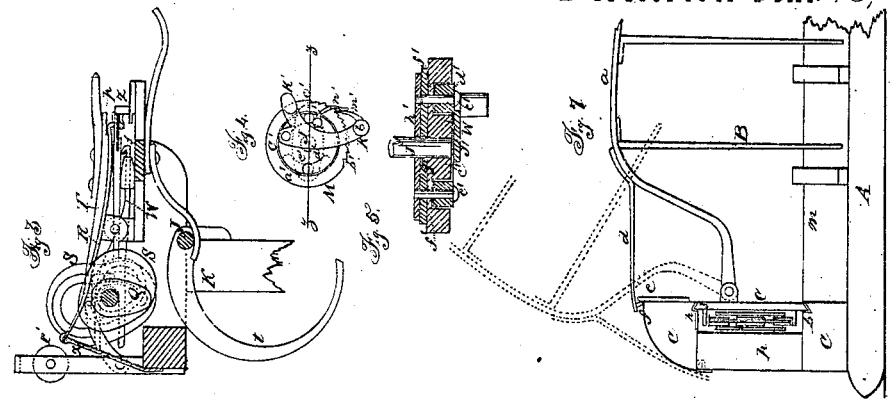
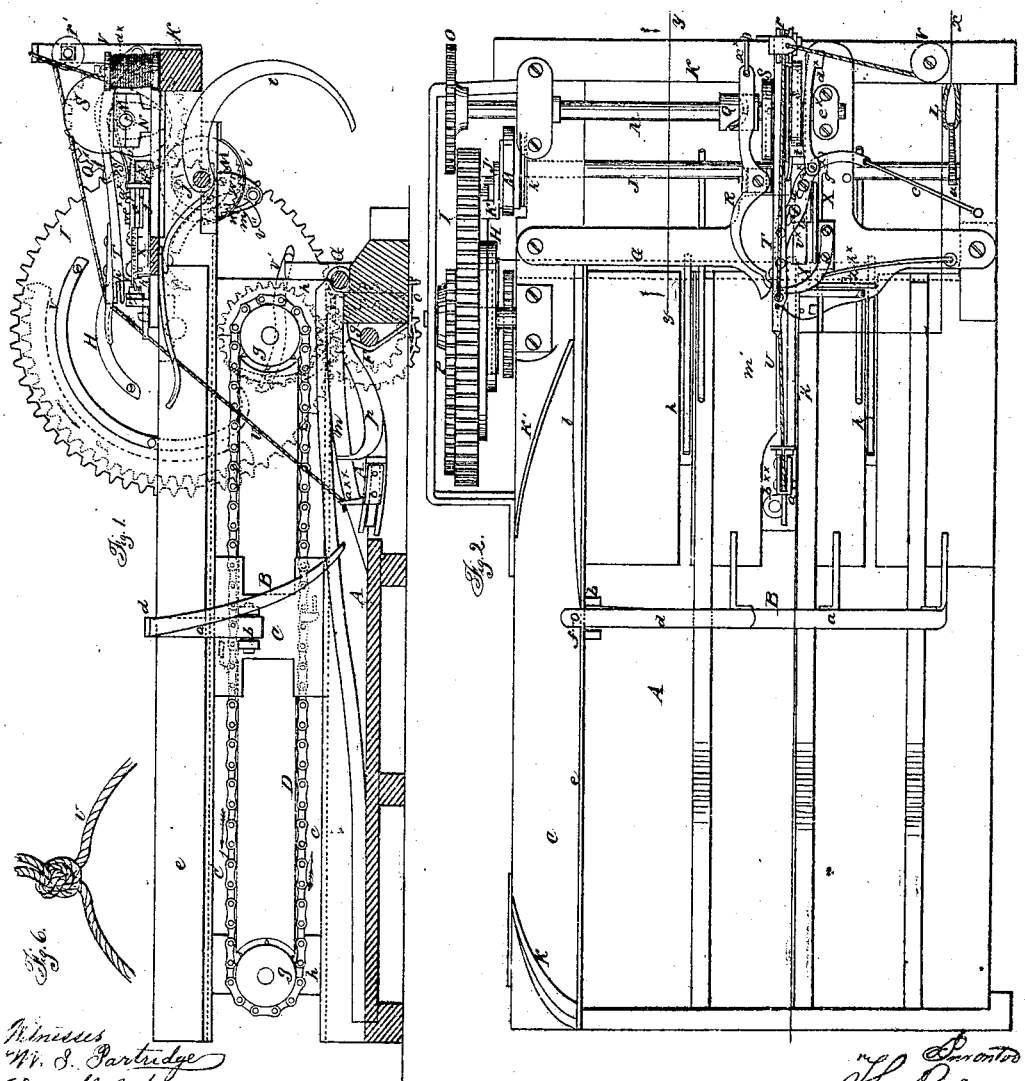

UNITED STATES PATENT OFFICE.

THEODORE PALMER, OF CATSKILL, NEW YORK.

IMPROVEMENT IN RAKING AND BINDING ATTACHMENTS TO HARVESTERS.

Specification forming part of Letters Patent No. 37,408, dated January 13, 1863.

*To all whom it may concern:*

Be it known that I, THEODORE PALMER, of Catskill, in the county of Greene and State of New York, have invented a new and Improved Raking and Binding Attachment for Harvesters; and I do hereby declare that the following is a full, clear, and exact description of the same, reference being had to the accompanying drawings, making a part of this specification, in which—

Figure 1 is a side sectional view of my invention, taken in the line $x\,x$, Fig. 2; Fig. 2, a plan or top view of the same; Fig. 3, a section of a portion of the same, taken in the line $y\,y$, Fig. 2; Fig. 4, a detached view of the means through which the collecting-hooks are operated; Fig. 5, an enlarged section of Fig. 4, taken in the line $z\,z$; Fig. 6, a detached view of the knot tied in the cord with which the sheaves are bound; Fig. 7, a detached view of the rake.

Similar letters of reference indicate corresponding parts in the several figures.

The object of this invention is to obtain a raking and binding attachment which may be applied to a harvester, and operated from the driving-wheel thereof, so as to gather or rake up the cut grain from the platform into gavels, and bind the same with a cord, the latter being tied with a knot so as to insure the firm binding of the sheaves.

The invention consists in the peculiar means employed for effecting the result above named, and which will be hereinafter fully shown and described.

To enable those skilled in the art to fully understand and construct my invention, I will proceed to describe it.

A represents the platform of a harvester, the part on which the cut grain falls as it is cut by the sickle, and B is a rake which is placed in a transverse position relatively with the platform A. The head $a$ of this rake is of bent or curved form, and is connected at its inner end by a joint or hinge, $b$, with a slide, C, the upper and lower edges of which are fitted in grooves $b'\,b'$, in parallel bars $c\,c$, at the back part of the platform A. (See Fig. 7.) To the rake-head $a$ there is attached an arm, $d$, which projects over a guide, $e$, attached to the upper bar $c$, and this arm has a pendent pin, $f$, attached to it, said pin extending down at the back of the guide $e$.

D is an endless chain, which works over two wheels $g\,g$, the axes of which are in uprights $h\,h$ at the back of the platform A. These wheels $g\,g$ are provided with teeth, which fit into the links of the chain D and prevent the slipping of the latter. (See Fig. 1.) The chain D has a projection, $i$, attached to one of its links, and this projection, as the chain D is operated, moves the slide C, and consequently the rake B, the projection $i$ coming in contact with horizontal pins $j$ at the inner side of the slide C, and communicating a reciprocating movement to the rake, the projection $i$ acting against the upper pin $j$ as the former passes along above the wheels $g$, and acting against the lower pin $j$ as it passes along below the wheels $g$, (see Fig. 1,) which in the projection $i$ and pins $j\,j$ are shown by dotted lines, and the direction of the movement of the chain indicated by the arrows 1.

The upper bar $c$, at the back of the platform A, has two curved oblique shoulders or ledges, $k''\,k'''$, upon it. The ledge $k''$ is a fixed or permanent one, but the ledge $k'''$ is a spring which the pin $f$ of the arm $d$ of the rake-head $a$ can force out and compel the pin $f$ at the backward movement of the rake to follow the ledge $k'''$ and pass down underneath the bar $c$. By this means the rake is elevated during its return movement, as indicated in Fig. 7, the pin $f$ passing up by the side of the fixed ledge $k''$ as the rake reaches the termination of its backward movement, so that the latter may assume a horizontal or working position at the commencement of its forward movement. The rake B, just previous to the termination of its forward movement, is slightly elevated by means of a beveled bar, $l$, which is at the back of the guide $e$. This elevation of the rake enables the teeth of the rake to pass up a slotted inclined surface, $m$, on the platform, the object of which will be presently shown.

The endless chain D is operated by means of a toothed wheel, $n$, which is on the axis of the front wheel $g$, and gears into a pinion, $o$, on the driving-shaft F. It will be seen that the elevating and lowering of the rake B are due to the head $a$ being connected to the slide C by the joint or hinge $b$.

G represents a shaft, which is fitted transversely in the platform A, and is provided with curved teeth $p$, which, by the turning of the shaft G, are made to rise and fall. These curved teeth are allowed, in descending, to pass through the slots in the elevated part $m$ of the platform. The shaft G does not make a complete revolution; it is simply turned first in one direction and then in the other by means of an india-rubber spring, $q$, and a cam, H, the latter being at the inner side of a toothed wheel, I, which is rotated by a pinion, $r$, on the driving-shaft F. The india-rubber spring $q$ has a tendency to keep the curved teeth $p$ down and below the inclined part $m$ of the platform, and the cam H elevates the teeth $p$ by coming in contact, at each revolution of the wheel I, with a curved arm, $s$, on shaft G.

J represents a shaft, which is placed in a frame, K, attached to the platform A. This shaft J has two curved arms or hooks, $t\ t$, attached to it, which I term collecting-hooks. These hooks $t\ t$ are also raised and lowered by the turning of the shaft J first in one direction and then in the other. The hooks $t\ t$ are moved upward and outward by means of an india-rubber spring, L, attached to an arm, $u$, on shaft J, and said hooks are moved downward by means of a friction and ratchet clutch, M, and cam-projections, $v\ v'\ v''$ at the inner side of the wheel I. The clutch M is composed of a wheel, $w$, which is permanently secured on the shaft J, and has a portion of its periphery smooth, as shown at $a'$, and a portion provided with ratchet-teeth, as shown at $b'$. (See Fig. 4.) The wheel $w$ has an annular groove, $c$, made in it, and in this groove an annular plate, $d'$, is fitted and secured therein by two screws, $e'\ e'$, which pass through oblong curved slots $f'$ in the wheel $w$, and through a piece of india-rubber, $g'$, and a metal plate, $h'$. (See Fig. 5.) The india-rubber $g'$ admits of a certain degree of play of the annular plate $d'$ in the groove $c'$, the oblong curved slots $f'$ admitting of the movement of the screws $e'$. These slots are shown by dotted lines in Fig. 4. The lower part of the wheel $w$ has its periphery covered by a curved plate, $i'$, which is attached to the frame K, and to the outer side of the annular plate $d'$ there is secured a bar, $j'$, one end of which is provided with a lip or projection, $k'$, and the other end provided with a lip or projection, $k^\times$. Said bar also has a pawl, $m'$, attached to it, against which a spring, $n'$, bears. Against these projections $k'\ k^\times$ the cam-projections $v\ v'\ v''$, at the inner side of the wheel I, act.

On the frame K there is also placed a shaft, N, which has a pinion on its outer end. This shaft N is rotated intermittently by means of toothed segments P, attached to the outer side of the wheel I. On the shaft N there is keyed a cam, Q, which operates a curved lever, R, which has an elastic cord, $x$, at its end. On this shaft N there are also keyed two other cams, S S', one of which, S, operates an arm, T, having a fork, $p'$, at its front end, and an eye, $q'$, the cord U, with which the sheaves are bound, passing through the latter and around a pulley, $r'$, said cord being on a spool, $v$, on the frame K. The cam S' operates a slide, W, which has a hook, $s'$, at its front end, and this slide has an arm, $t'$, projecting from it at right angles. This arm $t'$ extends back of a slide, $u'$, which is fitted on a guide, $v^\times$, and has a curved arm, $w'$, attached to it by two screws, $a^\times\ a^\times$, which pass through slots $b^\times\ b^\times$, in said arm, into the slide $u'$. The back end of the arm $w'$ has an elastic cord or india-rubber spring, $c^\times$, attached to it, and there is also a guide, $d^\times$, attached to the back end of said arm, said guide resting on the shaft N, between the cam S' and the inner bearing $e^\times$ of said shaft. X is a slide, which has a knife or cutter, Y, of curved form attached to it. The back end of the slide X is provided with a notch, $f^\times$, underneath which the arm $t'$ of the slide W catches when the latter is drawn back. On the frame K there is secured a small ledge or upright projection, $g^\times$, which at a certain time liberates the slide X from the arm $t'$, and admits of a spring, $h^\times$, throwing said slide X forward. Z is an arm, which is attached to the frame K, and has a small projection or knob, $i^\times$, at one end, said projection or knob being in line with the hook $s'$ of the slide W.

When the machine is in operation the endless chain D moves in the direction indicated by the arrows in Fig. 1, and the rake B, when moved by said chain toward the elevated part $m$ of the platform A, rakes the cut grain toward said elevated part $m$ and over the curved teeth $p$, which are below the slotted elevated part $m$ of the platform, while the rake B is thus operating. Just previous to the termination of this movement of the rake B, the hooks $t\ t$ are made to descend, and serve as a bearing or bed to receive the cut grain raked up by the rake. This movement of the teeth is effected by the action of the cam-projections $v\ v'\ v''$ on the lips or projections $k'\ k^\times$ of the bar $j'$, said cams effecting the downward movement of the hooks and retaining the same in a downward position a necessary length of time to admit of the sheaf being bound. When the hooks $t\ t$ are down the teeth $p$ are elevated in consequence of the cam H acting against the curved arm $s$ on shaft G, and the gavel to be bound is there embraced between the hooks $t\ t$, and the curved teeth $p$ and the cord U will be around said gavel, the outer end of the cord being grasped by a clamp, $a^{\times\times}$, which is attached to a slide, A', fitted in a slot at the outer end of the central tooth $p$. This slide A' is provided with an eye, $b^{\times\times}$, into which the front end of the arm T passes. And said arm and the slide A' are raised by the action of the cam S, the arm and slide drawing the cord snugly around the gavel. The clamp $a^{xx}$ of the slide A' passes into the fork $p'$ of the arm T. When the arm T is raised the lever R is operated by the cam Q, the lever winding the cord U around the projection or knob $i^x$ of the arm Z, and the hook $s'$ of the slide W is then shoved forward and backward by the cam $s''$, the hook in its backward movement drawing the cord through the loop, and thereby forming the knot, and the cutter Y cuts off the cord above the knot, the arm $w'$ serving as a bearing for the cord while being cut. As the slide W reaches the termination of its backward movement, the ledge or projection $g^x$ throws up the notch $f^x$ of the slide X free from the arm $t'$ of slide W, and the spring $h^x$ throws the knife or cutter Y back to its original position. The hooks $t\ t$ and teeth $p$ then return to their original position, by means of the springs formerly alluded to, while the rake, during the binding operation, returned back in an elevated position, so as to be at the end of the platform and ready for a succeeding operation by the time the other parts are in readiness to receive a succeeding gavel.

When the hooks $t\ t$ are first actuated, the shaft J is turned, directly through the medium of the bar $j'$, annular plate $d'$, and the india-rubber $g'$. This india-rubber $g'$, on account of its elasticity, will yield or give in case of a gavel of undue size being between the hooks $t\ t$ and teeth $p$, and admits of the bar $j'$ and plate $d'$ turning without communicating motion to the wheel M and shaft N. During this movement of the bar $j'$, the pawl $m'$ works over the curved plate $i'$, below the wheel M; but when the pawl $m'$ reaches the teeth $b'$ of wheel M, the latter, and consequently the shaft J, are turned with a positive movement. This arrangement insures an equal pressure of the hooks $t\ t$ on all the gavels, and prevents any of the parts connected with the operation of the shaft J from being subjected to any undue strain, a contingency which would be liable to occur in case of gavels of undue size being embraced by the hooks $t$ and teeth $p$.

Having thus described my invention, what I claim as new, and desire to secure by Letters Patent, is—

1. The combination of the rake B, endless chain D, guide $e$, ledges $k''\ k'''$, and beveled bar $l$, all arranged, as shown, to admit of the rake B operating as and for the purpose herein set forth.

2. The manner, as shown, of operating the hooks $t\ t$, or turning the shaft J thereof, to wit, by means of the wheel M, provided with a smooth and toothed periphery, the plate $d'$ connected with the india-rubber $g'$, the bar $j'$ provided with the pawl $m'$, and the cam-projections $v\ v'\ v''$ on wheel I, all arranged as and for the purpose herein set forth.

3. The combination and arrangement of the lever R, arm T, hook $s'$, cutter Y, arm Z, with the projection or knob $i^x$ at its end, arm $w'$, and the slide A', on the central tooth $p$ of the shaft G, all arranged to operate as and for the purpose specified.

THEO. PALMER.

Witnesses:
M. L. PARTRIDGE,
DANL. ROBERTSON.